(12) United States Patent
Abe et al.

(10) Patent No.: US 9,993,972 B2
(45) Date of Patent: Jun. 12, 2018

(54) SEAL CARVING APPARATUS AND SEAL CARVING METHOD

(71) Applicant: SHACHIHATA INC., Nagoya-Shi (JP)

(72) Inventors: Eiji Abe, Nagoya (JP); Masayoshi Uchida, Nagoya (JP)

(73) Assignee: Shachihata Inc., Nagoya-Shi (JP)

( * ) Notice: Subject to any disclaimer, the term of this patent is extended or adjusted under 35 U.S.C. 154(b) by 0 days. days.

(21) Appl. No.: 15/702,907

(22) Filed: Sep. 13, 2017

(65) Prior Publication Data
US 2018/0001575 A1   Jan. 4, 2018

Related U.S. Application Data

(62) Division of application No. 14/885,178, filed on Oct. 16, 2015, now Pat. No. 9,878,491.

(30) Foreign Application Priority Data

Oct. 30, 2014   (JP) .................................. 2014-222081

(51) Int. Cl.
| | |
|---|---|
| *B41K 1/50* | (2006.01) |
| *B29C 67/00* | (2017.01) |
| *B41D 7/00* | (2006.01) |
| *B41C 3/04* | (2006.01) |
| *B41K 1/02* | (2006.01) |
| *B41K 3/00* | (2006.01) |

(Continued)

(52) U.S. Cl.
CPC ............ *B29C 67/004* (2013.01); *B29C 44/02* (2013.01); *B41C 3/04* (2013.01); *B41D 7/00* (2013.01);

(Continued)

(58) Field of Classification Search
CPC ...... B41K 1/02; B41K 1/50; B41K 3/00; B41J 3/407; B41J 2/32; B41J 2/315;

(Continued)

(56) References Cited

U.S. PATENT DOCUMENTS 6,460,456 B1 * 10/2002 Sugiyama ................ B41D 7/00
                                                                101/327
9,302,520 B2 *  4/2016 Oshima .................... B41K 3/00

(Continued)

FOREIGN PATENT DOCUMENTS

| EP | 2 687 379 | 1/2014 |
|---|---|---|
| EP | 3 015 275 | 4/2016 |

(Continued)

*Primary Examiner* — Matthew G Marini
*Assistant Examiner* — Marissa Ferguson Samreth
(74) *Attorney, Agent, or Firm* — Burr & Brown, PLLC

(57) ABSTRACT

A seal carving apparatus includes a thermal head having a plurality of heat generating elements disposed in lines, and thermal drive control means that performs a control process of selectively and thermally driving the individual heat generating elements while moving the thermal head and a porous material in relative to each other with the thermal head being in abutment with the porous material, thereby forming a seal face on the porous material. The thermal drive control means controls a pulse time width for thermally driving the individual heat generating elements of the thermal head under pulse width modulation control based on gradation image data having a gradation value, thereby forming a seal with a gradation on the porous material.

6 Claims, 17 Drawing Sheets

(51) Int. Cl.
*B29C 44/02* (2006.01)
*B29K 105/04* (2006.01)
*B29K 101/12* (2006.01)
*B29L 31/00* (2006.01)

(52) U.S. Cl.
CPC ............... *B41K 1/02* (2013.01); *B41K 1/50* (2013.01); *B41K 3/00* (2013.01); *B29K 2101/12* (2013.01); *B29K 2105/04* (2013.01); *B29L 2031/767* (2013.01)

(58) Field of Classification Search
CPC ............ B41J 2/355; B41C 3/04; B41C 1/055; B41M 5/0052; B41M 5/0064; B41D 7/00; B29C 44/02; B29C 67/004; B29K 2101/12; B29K 2105/04; B29L 2031/767
See application file for complete search history.

(56) References Cited

U.S. PATENT DOCUMENTS

| | | | |
|---|---|---|---|
| 9,744,788 B2 * | 8/2017 | Yuno | B41K 1/38 |
| 2014/0020584 A1 * | 1/2014 | Abe | B41K 1/00 |
| | | | 101/333 |
| 2014/0333707 A1 * | 11/2014 | Hozumi | B41J 11/0015 |
| | | | 347/183 |

FOREIGN PATENT DOCUMENTS

| | | | | |
|---|---|---|---|---|
| JP | 04-070360 | * | 7/1990 | ............ B41J 2/365 |
| JP | 2009-208294 | * | 9/2009 | ............ B41J 2/365 |
| JP | 2009-208294 A | | 9/2009 | |
| JP | 2009-208294 A1 | | 9/2009 | |
| JP | 2014-043092 A1 | | 3/2014 | |

* cited by examiner

Side    Head surface

FIG. 12

| Cassette type | Kind | Processing size (mm) | Perforation pattern | Binary |
|---|---|---|---|---|
| 1 | Stamp | 10 × 10 | ●○○○● | 01110 |
| 2 | | 10 × 20 | ●○○●○ | 01101 |
| 3 | | 15 × 20 | ●○○●● | 01100 |
| 4 | | 15 × 30 | ●○●○○ | 01011 |
| 5 | | 20 × 20 | ●○●○● | 01010 |
| 6 | | 20 × 30 | ●○●●○ | 01001 |
| 7 | Label | 15 × 20 | ○●○○● | 10110 |
| 8 | | 15 × 30 | ○●○●○ | 10101 |
| 9 | | 20 × 25 | ○●○●● | 10100 |
| 10 | | 20 × 30 | ○●●○○ | 10011 |
| 11 | | 30 × 40 | ○●●○● | 10010 |

(V)

(VI)

(VII)

SEAL CARVING APPARATUS AND SEAL CARVING METHOD

CROSS-REFERENCE TO RELATED APPLICATIONS

This application is a Divisional of U.S. application Ser. No. 14/885,178, filed Oct. 16, 2015, the entirety of which is incorporated herein by reference, and claims the benefit under 35 USC § 119(a)-(d) of Japanese Patent Application No. 2014-222081 filed on Oct. 30, 2014.

BACKGROUND OF THE INVENTION

1. Field of the Invention

The present invention relates to a seal carving apparatus for a porous material, and a seal carving method in the seal carving apparatus.

2. Description of Related Art

A seal carving apparatus performs thermal carving of selectively and thermally driving individual heat generating elements of a thermal head while moving a workpiece of a porous material and the thermal head in relative to each other with the thermal head abutting on the workpiece to thereby form a desired seal on the porous material in order to produce a porous stamp (see Patent Literature 1, for example). The porous material having the seal processed by the seal carving apparatus is mounted on an ink impregnated member attached to a holder, so that a stamp having a seal pattern as ordered by a customer is assembled. Recently, seal carving apparatuses have been demanded of general versatility that permits carving of stamps or label sheets with various seal patterns and various sizes in response to customers' requests, and of convenience that permits anyone to operate the seal carving apparatus in a shop. To this end, a porous material is set on a dedicated attachment that fits the carving size of a porous stamp, and the attachment is mounted on the seal carving apparatus for seal carving.

The basic operation of a seal carving apparatus for seal carving is to perform melt-solidification on the top surface of a porous material with a thermal head to form a non-impression part where porousness is lost. Therefore, it is possible to process a monochromatic seal by performing ON/OFF control of driving heat generating elements for a non-print portion (non-impression part) on which the thermal head abuts, and not driving heat generating elements for a print portion (impression part). However, such simple ON/OFF control rings about a problem such that heat from the heat generating elements located at the edge of the non-impression part is transmitted to the region of an adjoining impression part. As a result, part of the porousness (ink permeability) of the contour of the print portion is lost, which may deform the contour with respect to the original image data. As one of solutions to such deformation of a print, a carving control method of separating a one-line ON/OFF heating process with the thermal head into plural sub-processes has been proposed (see, for example, Patent Literature 2).

CITATION LIST

Patent Literature

Patent Literature 1: Japanese Patent Application Laid-open No. 2014-43092

Patent Literature 2: Japanese Patent Application Laid-open No. 2009-208294

SUMMARY OF THE INVENTION

Problem to be Solved by the Invention

However, the conventional carving method of separating the aforementioned one-line ON/OFF heating process into plural sub-processes has a problem such that increasing the number of gradations to improve the accuracy of carving a seal needs a greater number of heating processes, making the time for carving the entire seal.

The invention has been made in view of such a problem, and it is an object of the invention to provide a seal carving apparatus that thermally drive a thermal head to form as seal on a porous material, and can accurately form, for example, the contour or the like of a print portion.

Means for Solving the Problems

To solve the aforementioned problem, the invention is a seal carving apparatus including a thermal head having a plurality of heat generating elements disposed in lines, loading means that moves the thermal head and a porous material in relative to each other with the thermal head being in abutment with the porous material, and thermal drive control means that performs a control process of selectively and thermally driving the individual heat generating elements line by line while making the relative movement to carry out melt-solidification of the porous material, thereby forming a seal, wherein the thermal drive control means performs PWM control on a pulse time width for thermally driving the individual heat generating elements based on gradation image data having a gradation value to form the seal on the porous material.

The seal carving apparatus with this configuration can accurately form a seal having a gradation as specified by given gradation image data. Further, with the same carving accuracy, the carving time can be shortened compared with the conventional apparatus.

The thermal drive control means in the seal carving apparatus may perform PWM control on driving amounts of the individual heat generating elements with a duty ratio of the pulse time width for a period of a modulation base signal which differs from a period of a carving period signal for forming one line of the seal. In this case, it is preferable that the period of the modulation base signal should be set shorter than the period of the modulation base signal for forming one line of the seal.

This configuration can provide a uniform driving amount for the individual heat generating elements during a period of one-line carving. Accordingly, it can be expected to reduce residual heat in the thermal head, thereby reducing the influence of heat transmitted to a nearby porous material.

Further, the thermal drive control means in the seal carving apparatus may control the pulse time width by setting an amplitude of a drive current that is supplied to the individual heat generating elements constant.

This configuration can eliminate the influence of the power to be supplied (amount of heat generated) even when the heating of the heat generating elements changes the electric resistance, thereby ensuring the carving accuracy.

Furthermore, the seal carving apparatus may further include gradation data preparing means that prepares the gradation image data having the gradation value based on monochromatic image data representing a given seal pattern, and driving amount conversion means that converts the prepared gradation image data to driving amount data of the individual heat generating elements, wherein the thermal drive control means may perform PWM control on driving amounts of the individual heat generating elements with a duty ratio corresponding to the driving amount data.

This configuration makes it possible to accurately form a seal having a gradation applied to given monochromatic image data.

Moreover, the gradation data preparing means in the seal carving apparatus may prepare gradation image data corrected in such a way that a pixel value monotonously changes stepwise in a boundary region where a value of the monochromatic image data is inverted.

This configuration makes it possible to accurately form a seal as specified by given monochromatic image data, which has the contour of a print portion subjected to gradation correction.

The invention is also a seal carving method in a seal carving apparatus including a thermal head having a plurality of heat generating elements disposed in lines, and control means that performs a control process of selectively and thermally driving the individual heat generating elements while moving the thermal head and a porous material in relative to each other with the thermal head being in abutment with the porous material, thereby forming a seal on the porous material, the seal carving method including the steps of causing the control means to convert gradation image data having a gradation value to driving amount data of the individual heat generating elements, and causing the control means to perform PWM control on driving amounts of the individual heat generating elements with a duty ratio corresponding to the driving amount data.

This seal carving method can accurately form a seal having a gradation as specified by gradation image data. Further, with the same carving accuracy, the carving time can be shortened compared with the conventional method.

The seal carving method may further include the step of causing the control means to prepare the gradation image data based on monochromatic image data representing a seal pattern.

This seal carving method makes it possible to accurately form a seal having a gradation applied to given monochromatic image data.

In the seal carving method, the control means may prepare the gradation image data corrected in such a way that a pixel value monotonously changes stepwise at a boundary where a value of the monochromatic image data is inverted.

This seal carving method makes it possible to accurately form a seal as specified by given monochromatic image data, which has the contour of a print portion subjected to gradation correction.

The invention is also a method of producing a porous stamp using a seal carving apparatus including a thermal head having a plurality of heat generating elements disposed in lines, and control means that performs a control process of selectively and thermally driving the individual heat generating elements while moving the thermal head and a porous material in relative to each other with the thermal head being in abutment with the porous material, thereby forming a seal on the porous material, the seal carving method including the steps of causing the control means to convert gradation image data having a gradation value to driving amount data of the individual heat generating elements, and causing the control means to perform PWM control on driving amounts of the individual heat generating elements with a duty ratio corresponding to the driving amount data.

Moreover, the invention is a porous stamp produced using a seal carving apparatus including a thermal head having a plurality of heat generating elements disposed in lines, and control means that performs a control process of selectively and thermally driving the individual heat generating elements while moving the thermal head and a porous material in relative to each other with the thermal head being in abutment with the porous material, thereby forming a seal on the porous material, wherein based on monochromatic image data representing a given seal pattern, the control means prepares gradation image data corrected in such a way that a pixel value monotonously changes stepwise in a boundary region where a value of the monochromatic image data is inverted, and the control means thermally drives the individual heat generating elements by a driving amount based on the gradation image data, thereby forming a seal with a gradation on the porous stamp.

Effects of the Invention

The seal carving apparatus and the seal carving method according to the invention can accurately form a seal having a gradation as specified by image data. For example, it is possible to accurately form a seal, which has the contour of a print portion subjected to gradation correction. Further, with the same carving accuracy, the carving time can be shortened compared with the conventional apparatus and method.

BRIEF DESCRIPTION OF DRAWINGS

FIG. 12 is a diagram exemplifying dot patterns predetermined in correspondence to the types of workpieces.

DETAILED DESCRIPTION OF THE INVENTION

Description of General Configuration of Seal Carving System

Figure 1:
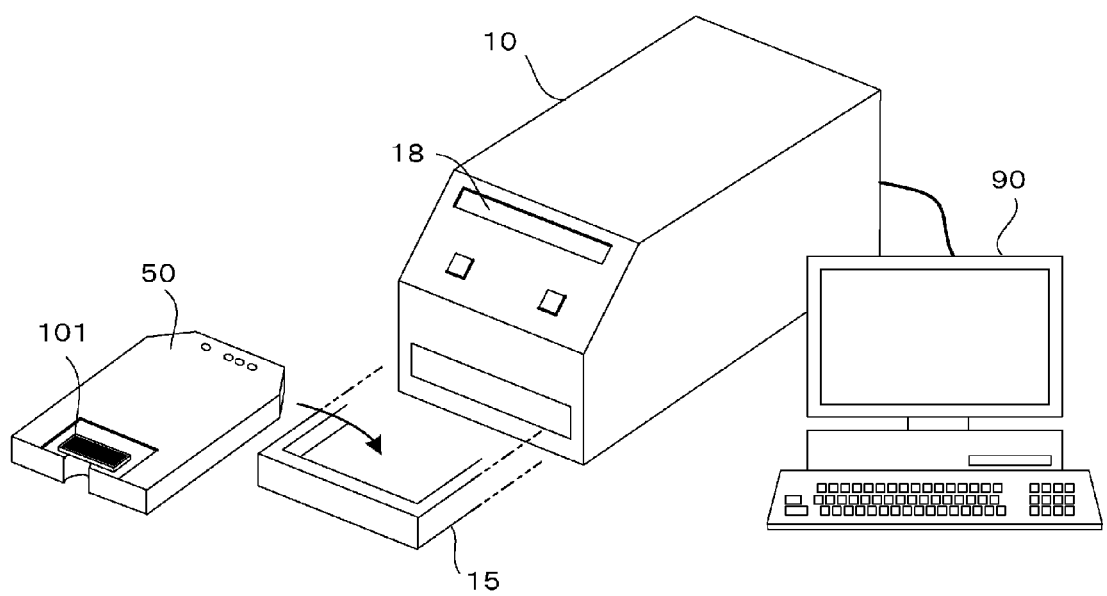
FIG. 1 is an external view illustrating the general configuration of a seal carving system including a seal carving apparatus.

The following describes in detail a specific embodiment of a seal carving apparatus according to the invention with reference to the accompanying drawings. FIG. 1 is an external view illustrating the general configuration of a seal carving system including a seal carving apparatus 10 according to the first embodiment. As illustrated in FIG. 1, the seal carving apparatus 10 is communicatably connected with a terminal device 90 serving as input manipulation means which is operated by a user (including an operator and a customer). FIG. 1 illustrates an example of a personal computer (PC) as the terminal device 90. It is to be noted however that the terminal device is not particularly limited to a PC, but may be anything including means that is communicatable with the seal carving apparatus 10 and with which a user can perform an input manipulation; for example, a portable terminal device such as a tablet PC or a smartphone may be available. Further, instead of a terminal device, a touch-panel type computer may be integrally connected to the seal carving apparatus 10 in the system.

A seal pattern of a stamp that a customer orders is prepared by, for example, editor software that runs on the terminal device 90, the prepared seal pattern (artwork data, monochromatic image data) is transmitted to the seal carving apparatus 10. Image data read out by a scanner, a camera or the like may be fetched into the terminal device 90, and seal pattern data may be prepared using dedicated software. Further, a customer may upload seal pattern data to a host server on a Web site in advance, and a member of a workshop may download the seal pattern data onto the terminal device 90, and carves the seal pattern data with the seal carving apparatus 10.

(Description of Seal Carving Apparatus)

Next, the body of the seal carving apparatus 10 is described in connection to the porous impression die 101 which is a stamp as a kind of the workpiece by way of example. The seal carving apparatus 10 selectively and thermally drives individual heat generating elements 12a on a thermal head 12 while relatively moving the thermal head 12 and the porous impression die 101 in abutment with each other to achieve melt-solidification of a porous material, thereby implementing line-by-line formation of a seal. The term "abutment" means that the height position of the thermal head 12 matches with the height position of the top surface of the workpiece (porous impression die 101). If the heat of radiation from the thermal head 12 heats and melts the porous material, the state where the thermal head 12 faces the porous material with a gap of microns therebetween is included in "abutment." The state where the heat from the thermal head 12 is loaded to the porous material via an intervention of a resin film or the like is also conceptually included in "abutment." The term "relative movement" may be the movement of the porous impression die 101 with the position of the thermal head 12 fixed, or the movement of the thermal head 12 with the position of the porous impression die 101 fixed. An embodiment of the former configuration of moving the porous impression die 101 with the position of the thermal head 12 fixed is described herein.

The seal carving apparatus 10 includes a tray 15 which is means for loading the attachment 50. The tray 15 is reciprocally loaded between a discharge position where the attachment 50 can be attached or detached and an accommodation position inside the seal carving apparatus 10 by a loading mechanism 16 (see FIG. 2) provided inside the seal carving apparatus 10. A display part 18 that displays the operational state of the apparatus (completion of preparation, mounting of the attachment, reading data, printing, discharge of the attachment, an error, etc.), the type of the workpiece (kind and carving size), and the like in characters or the like, and manipulation switches for performing various manipulations, etc. are provided on the front surface portion of the seal carving apparatus 10. A communication connector, such as USB, D-SUB or Ethernet (registered trademark), for communicative connection to the terminal device 90, a power supply connector, and the like, though not illustrated, are provided on the rear surface portion of the seal carving apparatus 10.

Figure 2:
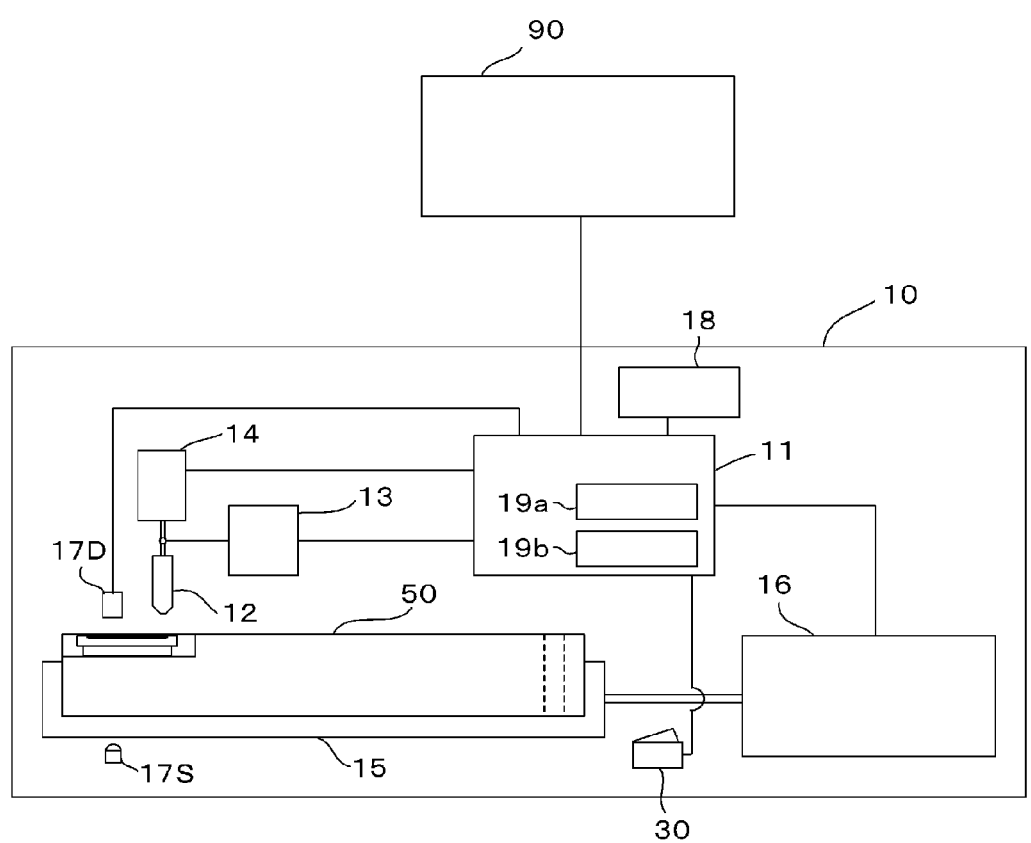
FIG. 2 is a block diagram illustrating the schematic configuration of the seal carving apparatus.

FIG. 2 is a block diagram illustrating the schematic configuration of the seal carving apparatus 10 according to the first embodiment. The seal carving apparatus 10 includes the thermal head 12 having a plurality of heat generating elements 12a, 12a, . . . , the attachment 50 on which the porous impression die 101 is set, a loading mechanism 16 that relatively moves the porous impression die 101 set on the attachment 50 and the thermal head 12 in abutment with each other, and a control device 11 that performs a thermal carving control of thermally driving the heat generating elements 12a, 12a, . . . on the thermal head 12 while controlling the movement loaded out by the loading mechanism 16 to form a seal on the top surface of the porous impression die 101.

Figure 3:
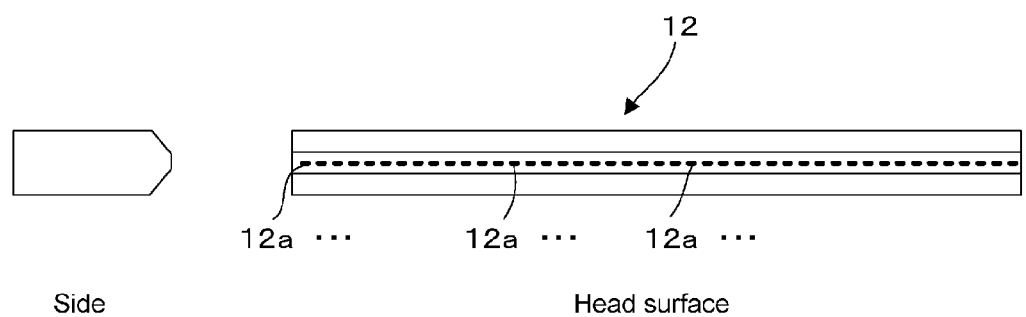
FIG. 3 is a two-side view illustrating a head surface and a side surface of a thermal head.

FIG. 3 is a two-side view illustrating the head surface and the side surface of the thermal head 12. As illustrated in this diagram, the plurality of heat generating elements 12a, 12a, . . . are disposed in a line at equal intervals on the head surface of the thermal head 12 (the surface that abuts on the porous impression die 101 to be subjected to seal carving). The layout pitch of the heat generating elements 12a, 12a, i.e., the size of a single heat generating element 12a is equivalent to the theoretical minimum carving pixel size of seal carving. The dot density of the heat generating elements 12a on the thermal head 12 may be set to, for example, 300 dpi (dots/inch) or so. As thermal drive means 13 selectively supplies the individual heat generating elements 12a, 12a, . . . within a period of the curving cycle of one line under control of the control device 101, the thermal head 12 forms a single line of the seal on the porous impression die 91. The thermal head 12 is moved, under control of the control device 11, between the positions of the thermal head 12 close to and away from the workpiece, by an elevation mechanism 14.

Figure 4:
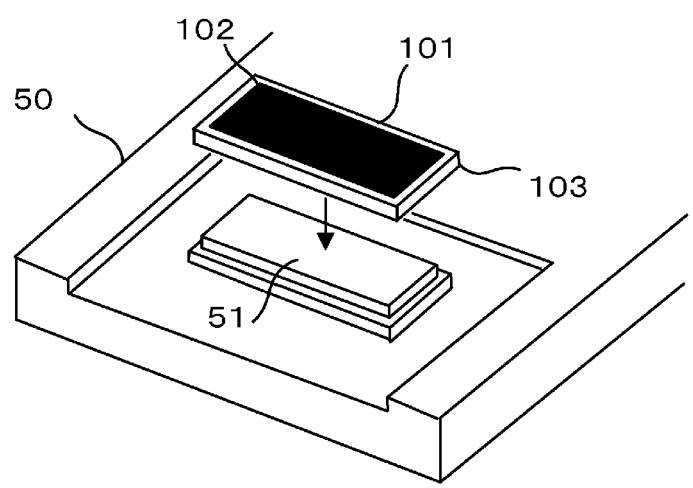
FIG. 4 is a perspective view illustrating the exterior appearance of a porous impression die to be set on an attachment.
Figure 5:
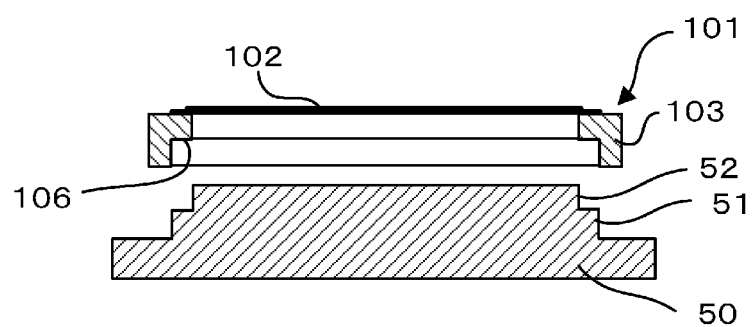
FIG. 5 is a cross-sectional view illustrating the porous impression die to be set on the attachment.

FIG. 4 is a perspective view illustrating the exterior appearance of the porous impression die 101 to be set on the attachment 50. FIG. 5 is a cross-sectional view of the porous impression die 101. As illustrated in FIGS. 4 and 5, the porous impression die 101 is formed to have a rectangular enclosing frame 103 and a porous film 102 stretched so as to block the upper surface opening of the frame 103. The term "front surface" or "top surface" refers to the surface of that side where a seal is to be formed, and the term "rear surface" or "bottom surface" refers to the surface of a side opposite to that side where a seal is to be formed. The rear surface opening of the frame 103 is formed wider than the front surface opening, and a recessed step 106 is formed inside the frame 103 as illustrated in FIG. 5. The frame 103 with such a shape is molded of, for example, a thermoplastic resin having a small thermal deformation.

The material for the porous film 102 is not particularly limited as long as it is a porous material whose top surface can be heated and melted by the thermal head 12. The raw materials available for the porous material may include, for example, thermoplastic elastomers of styrene type, vinyl chloride type, olefin type, polyester type, polyamide type, and urethane type. To obtain porousness, a filler, such as starchy, sodium chloride, sodium nitrate or calcium carbonate, and a row material resin are kneaded into a sheet with a heating/pressuring kneader, a heating roller or the like, and after the sheet is cooled, the filler is eluted with water or dilute acid water. The melting temperature of the porous material prepared by this method is the same as that for the raw material resin. Adding an accessory component, such as pigment, dye or organic substance, to the resin permits adjustment of the melting temperature of the porous material. The melting temperature of the porous material is, for example, 70° C. to 120° C.

The porosity and pore diameter of the porous film 102 can be adjusted by the particle size of the dissolved material to be kneaded and the content thereof. The porosity of the porous film 102 according to the embodiment is, for example, 50% to 80%, and the pore diameter thereof is 1 μm to 20 μm. The porous film 102 may have a double-layered structure with the lower layer (rear surface side) having a pore diameter of 50 μm to 100 μm. The porous impression die 101 which is the target for seal carving is prepared by the porous film 102 thermally fused to the periphery (front end face) of the front surface opening of the frame 103.

Figure 6:
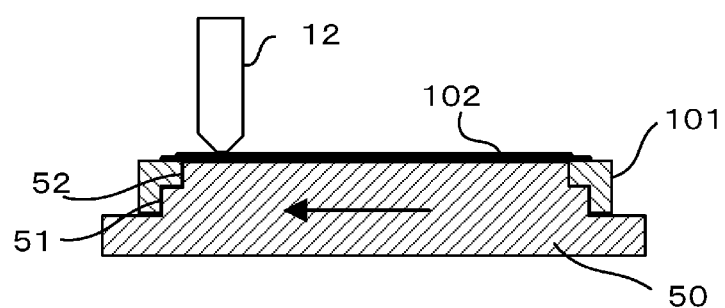
FIG. 6 is a cross-sectional view of the porous impression die at the time of thermal carving.

FIG. 6 is a cross-sectional view of the porous impression die 101 at the time of thermal carving. As illustrated in FIGS. 5 and 6, the porous impression die 101 is set on the attachment 50 as the recessed step 106 is fitted over a projecting step 52 of a pedestal 51 from the bottom side of the frame 103. With the porous impression die 101 set on the pedestal 51 of the attachment 50, the horizontal position of the bottom surface of the porous film 102 coincides with that of the top surface of the projecting step 52, so that both surfaces preferably contact with each other. In other words, the frame 103 of the porous impression die 101 is held on the fitting pedestal 51, the bottom surface of the porous film 102 is received by the top surface of the projecting step 52. As the porous impression die 101 is moved in a direction orthogonal to the line of the thermal head 12 abutting on the top surface of the porous impression die 101 set on pedestal 51, line-by-line seal carving is carried out.

When the heat generating elements 12a are driven with the thermal head 12 in direct contact with the top surface of the porous impression die 101, the heated and melted porous material is adhered to the thermal head 12, which causes an inconvenience of increasing the frictional force or inadequate prepressing. To overcome those problems, a resin film (not shown) may be intervened between the porous impression die 101 and the thermal head 12. Such a resin film needs to have a heat resistance with a higher melting point than that of the porous material used for the porous impression die 101, and low friction and smoothness that do not cause the seal to furrow. As to the resin film, poly films of materials such as cellophane, acetate, polyvinyl chloride, polyethylene, polypropylene, polyester, polyethylene terephthalate, polytetrafluoroethylene, and polyimide, may be used. The intervention of such a resin film can reduce the influence of the residual heat remaining in the thermal head 12 in addition to the prevention of furrows of the porous material.

The heating value Q when one heat generating element 12a on the thermal head 12 is driven is expressed by the following formula 1.

$$Q = k \times I \times t \quad (1)$$

where k is the thermal conversion efficiency coefficient, I is the drive current, and t is the drive time. According to the formula 1, the heating value Q of the heat generating element is proportional to the amount of drive Dq (Dq=I×t) which is the product of the drive current and the drive time.

Figure 7:
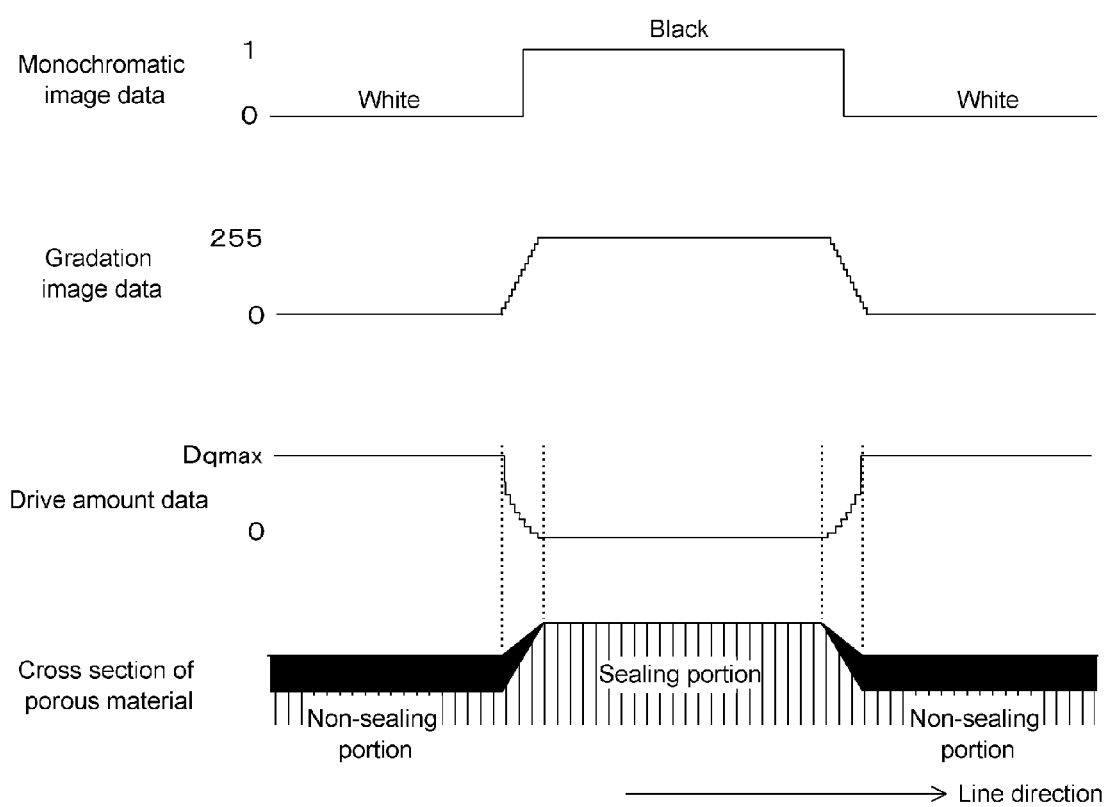
FIG. 7 is a diagram exemplifying artwork data, gradation image data, driving amount data, and the cross section of a porous material.

As illustrated in FIG. 7, artwork data representing a seal pattern to be stored in a memory in the terminal device 90 is of a binary (monochromatic) bit map form. For example, the pixel value of what is called "black" corresponds to the print portion (impression part) of a stamp is "1," and the pixel value of what is called "white" corresponds to the non-print portion (non-impression part) of a stamp is "0." This binary artwork data representing a seal pattern to be carved is referred to as "monochromatic image data." The basic operation of seal carving in the seal carving apparatus 10 is to thermally drive the heat generating elements 12a on the thermal head 12 to heat and melt the top surface of the porous impression die 101 which is in abutment with the thermal head 12 for solidification of the top surface, so that the non-impression part which has lost the porousness is formed on the top surface of the porous impression die 101. Therefore, basically, the control device 11 can carve a seal by performing what is called ON/OFF control of not driving the heat generating elements corresponding to the print portion (impression part) (Dq=0) and driving the heat generating elements corresponding to the non-impression part (Dq=Dqmax) according to the monochromatic image data.

However, such simple ON/OFF control according to binary monochromatic image data brings about a problem such that the residual heat accumulated in the thermal head 12 is loaded at the position of the edge of the non-impression part to the region of a nearby impression part. As a result, part of the porousness (ink permeability) of the contour of the print portion is lost, which may bring about an inconvenience such that the contour becomes narrower than that of the original image data or is deformed or the like. To prevent such deformation of a print, the terminal device 90 according to the embodiment includes gradation data preparing means that prepares gradation image data having, for example, gradation of 8 bits (256 gray scales) based on monochromatic image data.

The gradation data preparing means included in the terminal device 90, for example, prepares gradation image data corrected so that the pixel value monotonously changes stepwise in the boundary region (region at which the values of white and black are reversed) between the print portion (impression part) and the non-impression part of monochromatic image data as illustrated in FIG. 7. "Monotonous change" referred to herein includes a case where gradation image data is corrected non-linearly based on monochromatic image data. Driving amount conversion means included in the control device 11 converts the prepared gradation image data to data on the driving amount of each heat generating element 12a on the thermal head 12. At the time of calculating the driving amount Dq of the heat generating elements 12a, the driving amount conversion means can consider the correlation property between the driving amount of the heat generating elements and the porousness (ink permeability).

Now, the permeation ratio of ink which is an index indicating the porousness quantitatively can be defined as a permeation ratio which is normalized with the initial porosity of the porous material before thermal carving being regarded as 1 (100%) and the porosity of the porous material after the heat generating elements are driven with the maximum driving amount (Dq=Dqmax) for thermal carving being regarded as 0 (0%). Because the porous material contracts slightly and changes its thermal conductivity according to heating and melting, the driving amount of the heat generating elements and the ink permeability may not necessarily be proportional to each other. Accordingly, non-linear correlation property data between the driving amount of the heat generating elements and the ink permeability, which has been measured through an experiment or the like beforehand, is stored in the memory (e.g., ROM 19b or the like) of the terminal device 90 or the control device 11.

The gradation data preparing means may prepare gradation image data corrected based on monochromatic image data in view of the aforementioned non-linear correlation property (relation between the driving amount of the heat generating elements and the ink permeability). In this case, gradation image data having a relation such that the gradation value of the gradation image data and the driving amount of the heat generating elements are proportional to each other is prepared, so that the driving amount conversion means in the control device 11 can obtain driving amount data from the gradation image data directly (specifically, without performing the non-linear correction or the like).

Thermal drive control means 24 included in the control device 11 performs PWM (Pulse Width Modulation) control on the thermal drive means 13 to control the individual heat generating elements 12a on the thermal head 12 with the thermal driving amount Dq according to the thermal drive data, thereby forming a seal face on the porous impression die 101 line by line. The PWM control is the method of setting the amplitude of the drive current which flows into the heat generating elements 12a constant and controlling the pulse duration (duty ratio) to thereby control the driving amount Dq to the heat generating elements 12a. Alternatively, the thermal driving amount Dq may be controlled under PWM control with the amplitude of the voltage to be applied to the heat generating elements 12a being set constant.

Figure 8:
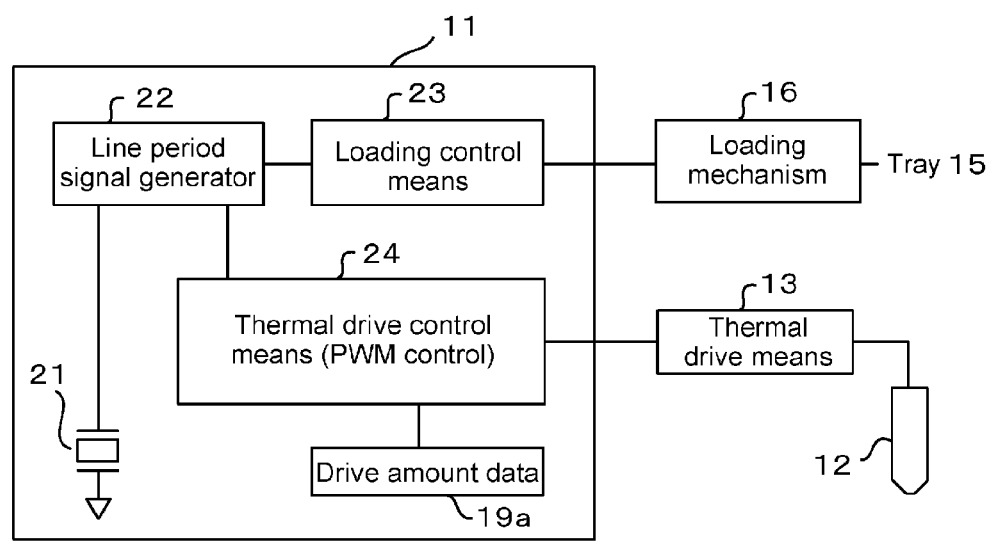
FIG. 8 is a simplified block diagram of a control device including thermal drive control means.

FIG. 8 is a simplified block diagram of the control device 11 including thermal drive control means 24. An oscillator 21 illustrated in FIG. 8 outputs a basic clock signal of a predetermined period. The oscillator 21 may be a system clock signal source that causes the CPU of the control device 11 to operate. The basic clock signal output from the oscillator 21 is frequency-divided by a frequency divider 25. Then, a secondary clock signal frequency-divided is supplied to the line period signal generator 22. The line period signal generator 22 generates a line period signal based on this secondary clock signal. The "line period signal" herein is a signal synchronous with a period for one-line carving. While the seal carving apparatus 10 is in carving operation, loading control means 23 controls the loading mechanism 16 in synchronism with the line period signal to move the porous impression die 101 line by line.

Figure 9:
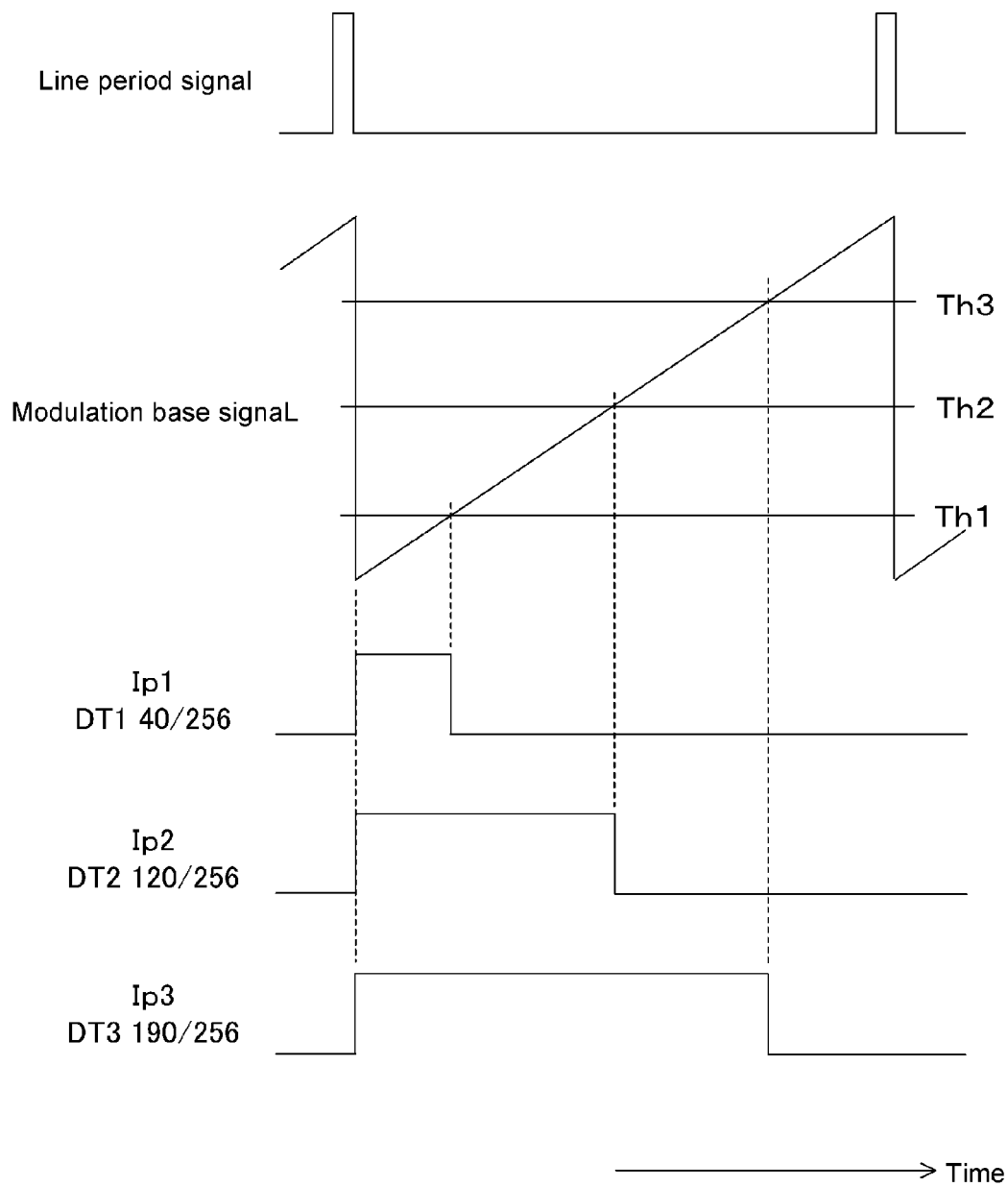
FIG. 9 is a time chart exemplifying waveforms a modulation base signal and a drive current pulse according to a first embodiment.

The frequency divider 25 provides a base signal counter 27 of the thermal drive control means 24 with another secondary clock signal. The secondary clock signal to be supplied to the base signal counter 27 and the line period signal may have the same frequency, or may have different frequencies. The base signal counter 27 counts the secondary clock signal to generate a triangular-wave modulation base signal as illustrated in FIG. 9, for example. The base signal counter 27 is an analog output counter that outputs a count value of clock signals in terms of a voltage value. Upon reception of the line period signal from the line period signal generator 22, the base signal counter 27 rests the count value, and restarts counting from zero. The base time width of PMW control, which is the period of the modulation base signal, is determined based on the period of the clock signal supplied to the base signal counter 27 and the maximum count value of the base signal counter 27.

The thermal drive control means 24 determines a duty ratio corresponding to driving amount data for each heat generating element 12a, and supplies a PWM gate signal having a pulse time width with that duty ratio to an associated transistor in the gradation image data thermal drive means 13. FIG. 9 is a time chart exemplifying waveforms of the modulation base signal under PWM control and a drive current pulse Ip for thermally driving the heat generating elements 12a, according to a first embodiment. In the embodiment illustrated in FIG. 9, the line period signal which is a carving period signal for one line, and the modulation base signal are synchronized with each other in the same period (same frequency). Therefore, the driving amount Dq for each heat generating element 12a (current amplitude of the drive current pulse Ip×pulse time width) is determined by the duty ratio of the pulse time width with respect to the period time of the line period signal. The thermal drive control means 24 drives the individual heat generating elements 12a at the duty ratio corresponding to the driving amount data under PWM control.

To give a further description with reference to the example of FIG. 9, with driving amount data being stored in a RAM 19a, for example, when driving amount data to a certain heat generating element 12a is 40/256 of the maximum driving amount Dqmax, the thermal drive control means 24 sets a duty ratio DT1 to 40/256, and generates a PWM gate signal with that duty ratio DT1. More specifically, a DA converter 28 inputs a threshold signal Th1 of a voltage value corresponding to the value 40/256 of the driving amount data to a comparator 29. The comparator 29 compares the modulation base signal, which is a triangular-waveform period signal, with the threshold signal Th1, and supplies a gate signal that is enabled only when the voltage of the threshold signal Th1 is higher than the voltage of the modulation base signal into the associated transistor in the thermal drive means 13. The thermal drive means 13 supplies a drive current pulse Ip1 amplified to a certain current amplitude to the associated heat generating element 12a only for the ON duration of the gate signal. Accordingly, the heat generating element 12a is driven under PWM control with the duty ratio DT1 corresponding to the driving amount data.

In this manner, the thermal drive control means 24 controls the pulse time width for thermally driving the individual heat generating elements 12a on the thermal head 12 according to the driving amount data prepared based on the gradation image data. This makes it possible to accurately form an impression part as specified by given image data, which has the contour of a print portion subjected to gradation correction. Further, with the same carving accuracy, the carving time can be shortened compared with the conventional apparatus.

Figure 10:
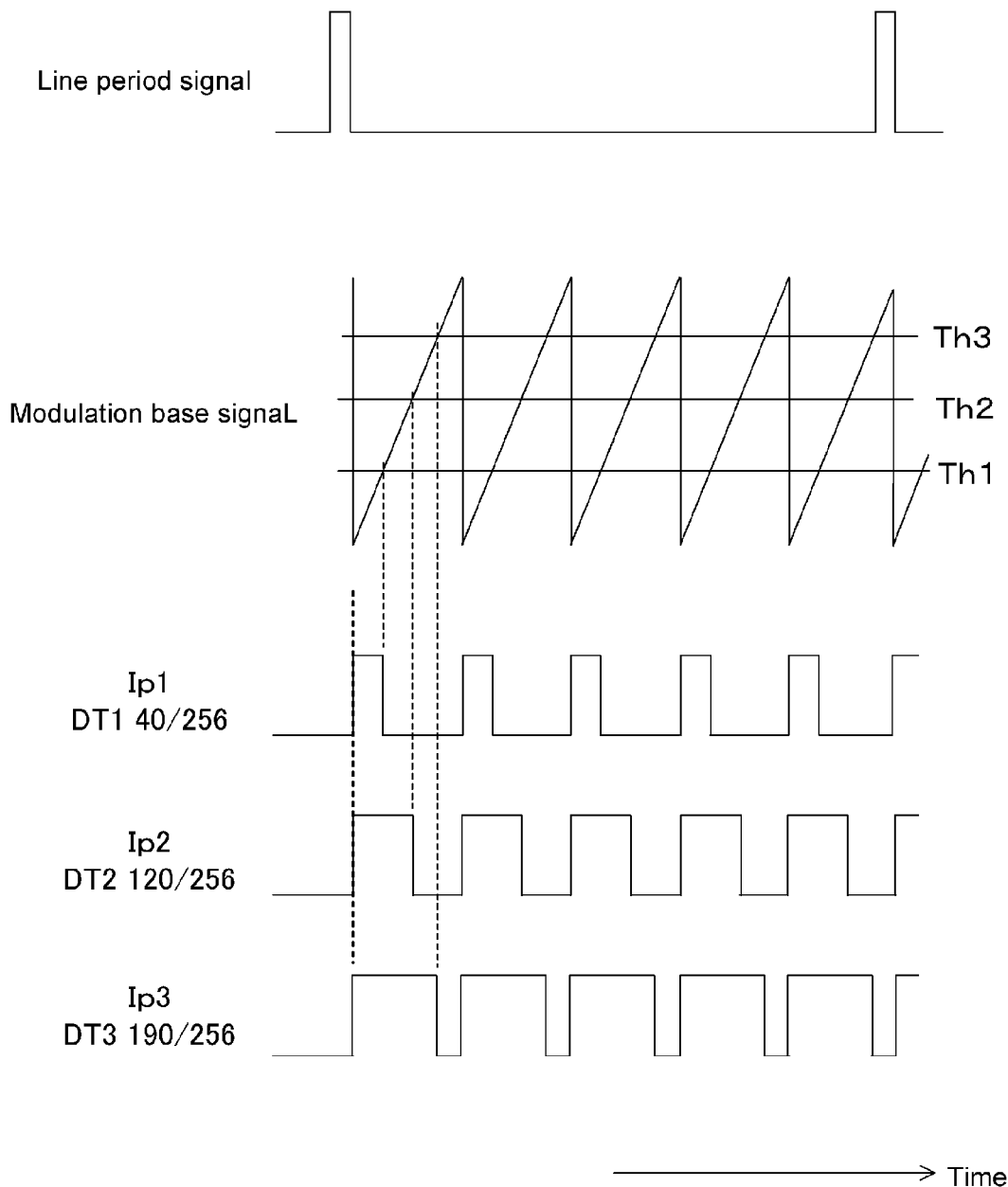
FIG. 10 is a time chart exemplifying waveforms of a modulation base signal and a drive current pulse according to a second embodiment.

FIG. 10 is a time chart exemplifying waveforms of the modulation base signal under PWM control and a drive current pulse Ip for thermally driving the heat generating elements 12a, according to a second embodiment. In the second embodiment illustrated in FIG. 10, the line period signal which is a carving period signal for one line, and the modulation base signal are synchronized with each other in different periods (different frequencies). In this case, the driving amount Dq for each heat generating element 12a is determined by the duty ratio of the pulse time width of the drive current with respect to the period time of the modulation base signal. The thermal drive control means 24 drives the individual heat generating elements 12a at the duty ratio corresponding to the driving amount data under PWM control.

In the embodiment of FIG. 10, the carving period for forming one line of a seal is set shorter than the period of the modulation base signal. Shortening the period of the modulation base signal makes uniform the drive current pulse Ip to be supplied to the individual heat generating elements 12a on the thermal head 12 during a one-line carving period. This makes it possible to reduce residual heat in the thermal head 12, thereby reducing the influence of heat that is transmitted to a nearby porous material. It should be noted that the modulation base signal under PWM control should not necessarily be synchronized with the line period signal to expect similar effects.

The seal carving apparatus 10 according to this embodiment may also perform seal carving with gradation given to the contour of the print portion, a logo or the like to decorate the print using the above-described gradation data preparing means, driving amount conversion means and thermal drive control means. In this case, the pattern data (artwork data) of the seal which is decorated with gradation or the like may have gradation values beforehand.

Figure 11:
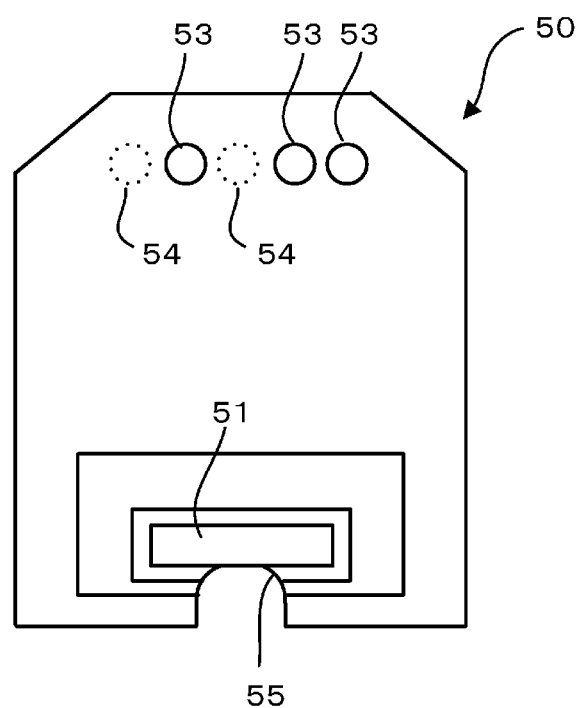
FIG. 11 is a front view of an attachment for a porous impression die.

Next, the attachment 50 which is mounted on the seal carving apparatus 10 is described. A workpiece for the seal carving apparatus 10, such as the porous impression die 101, is set on the attachment 50. FIG. 11 is a front view of the attachment 50 for the porous impression die 101. The pedestal 51 that is fitted over the bottom side of the porous impression die 101 is formed on the top surface of the body of the attachment 50. A row of perforations 53, 53, . . . of a dot pattern predetermined in correspondence to the type of a workpiece to be set is formed through a part of the body of the attachment 50. Additionally, a notch 55 cut away in a U shape from an end of the attachment 50 to part of the pedestal 51.

FIG. 12 exemplifies an example of the dot patterns predetermined in correspondence to the types of workpieces. A dot pattern for identifying a type of a workpiece and/or a type of the attachment 50 is an array pattern of the combination of the perforations 53, 53, . . . and blanks 54, 54, . . . . Here, "blank" means a region in the dot pattern where perforations are not formed in the body of the attachment 50. As apparent by referring to FIG. 12, for example, the dot pattern of the perforations 53, 53, . . . illustrated in FIG. 11 is '01011' in binary notation, which makes it possible to identify that the attachment is of a type "4" for a workpiece whose kind is "stamp," and whose carving size is "15×90 mm."

Figure 13:
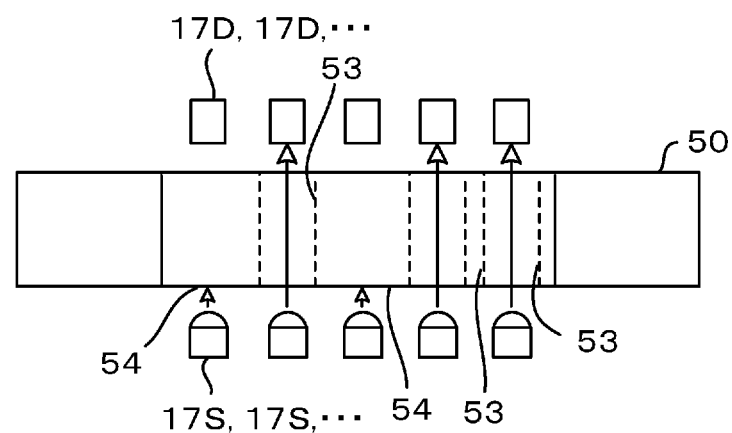
FIG. 13 is a diagram illustrating an embodiment of reading means.

The seal carving apparatus 10 includes reading means that reads a dot pattern of the perforations 53, 53, . . . at the position where the attachment 50 is mounted. The "position where the attachment 50 is mounted" may be either the position at which the attachment 50 is placed on the discharged tray 15, or the position at which the attachment 50 is slightly loaded into the seal carving apparatus 10 (first load-in position). This reading means may include, for example, photodiodes 17S that emit light from below the attachment 50, and photodetectors 17D that are disposed above the attachment 50 and opposite to the photodiodes 17S (transmissive photosensor), as illustrated in FIG. 13. Alternatively, the configuration may have the photodiodes 17S provided above the attachment 50, and the photodetectors 17D provided under the attachment 50. If the number of the dots of a perforation pattern is five, for example, photosensors including five pairs of photodiodes 17S and photodetectors 17D corresponding to the positions of the perforations 53 and the blanks 54 should be provided. According to the configuration of this transmissive sensor type reading means, the light emitted by the photodiode 17S and passing through the perforation 53 is detected by the photodetector 17D. When the light emitted by the photodiode 17S is blocked by the blank 54, on the other hand, the photodetector 17D do not detect light.

In another embodiment of the reading means, though not illustrated, reflective photosensors that read the pattern of blanks 54, 54, . . . may be provided. In a further embodiment of the reading means, a mechanical switches that read the pattern of perforations 53, 53, . . . and blanks 54, 54, . . . may be provided.

The transmissive or reflective photosensors 17S, 17D can read the dot pattern 53, 54 in a non-contact manner. Accordingly, misalignment or the like of the attachment 50 which would otherwise be caused by an unnecessary contact to read the dot pattern 53, 54 does not occur, so that the accuracy of the relative positional relation between the workpiece and the thermal head 12 can be maintained.

Figure 14:
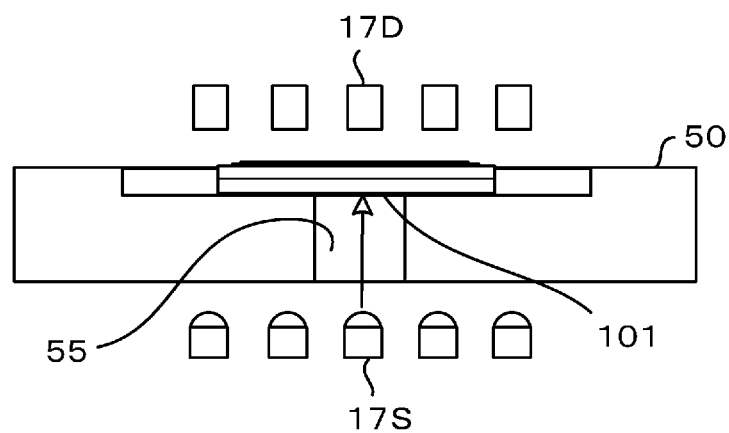
FIG. 14 is a diagram illustrating an embodiment according to which the reading means examines the setting state of a workpiece.
Figure 15:
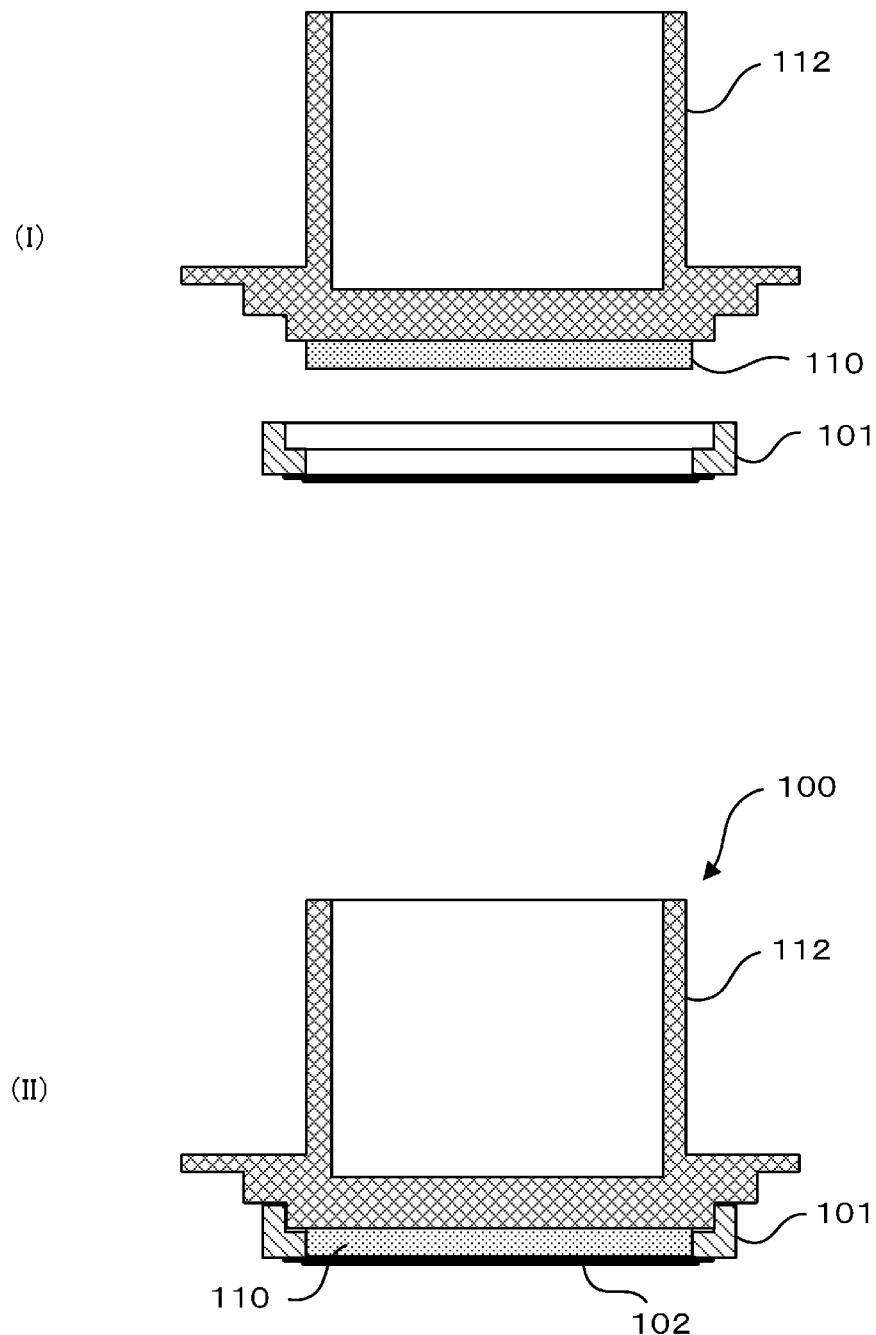
FIG. 15 is a diagram for describing how to assemble a stamp with a porous impression die having a seal formed thereon.

The photosensors 17S, 17D which constitute the above-described reading means included in the seal carving apparatus 10 also serve to examine the setting state of a workpiece on the attachment 50 at the position where the attachment 40 is located at the carving start position or the load-in position. That is, the notch 55 cut away up to part of the pedestal 51 is formed in the body of the attachment 50, so that when the porous impression die 101 as a workpiece is set on the pedestal 51, the notch 55 is blocked by part of the porous impression die 101. As illustrated in FIG. 14, as the photosensors 17S, 17D read the state of the notch 55, the setting state of the porous impression die 101 on the attachment 50 is examined. When the light emitted toward the notch 55 from the photodiodes 17S is blocked by part of the porous impression die 101 so that it is not detected by the photodetectors 17D, it is possible to determine if the workpiece is set properly or not on the attachment 50.

According to this configuration, the reading means (photosensors 17S, 17D) that read the dot patterns 53, 54 of the attachment 50 can also examine the setting state of a workpiece on the attachment 50. Accordingly, even when the attachment 50 is mounted on the seal carving apparatus 10 without a workpiece set on the attachment 50 or even when the attachment 50 is mounted on the seal carving apparatus 10 with a workpiece improperly set on the attachment 50, initiation of the carving process can be prevented. Therefore, it is possible to prevent an improper processing manipulation or the like in advance, enhancing the user's convenience. Moreover, the reading means (photosensors 17S, 17D) serve to perform two functions of reading the dot patterns 53, 54 of the attachment 50 and examining the setting state of a workpiece, so that the general configuration of the seal carving apparatus 10 can be simplified.

(Description of Seal Carving Method)

Next, a seal carving method using the seal carving apparatus 10 according to the embodiment is described in connection to the fabrication of the porous stamp assembly 100 as an example.

1. Operation the User Performs

First, a user (including a customer) inputs data (monochromatic artwork data) of a seal pattern of a stamp to be created via the terminal device 90. The seal pattern data may be prepared with dedicated software. Further, text data prepared by the user in advance may be input to the terminal device 90. Furthermore, image data read out by a scanner, a camera or the like may be fetched into the terminal device 90. Then, the user inputs the type information on the kind of a workpiece (stamp or label sheet), and the carving size or the like, according to an instruction from dedicated human interface software that runs on the terminal device 90. The monochromatic image data of the seal pattern and the type information on the workpiece which are input are stored in the memory in the terminal device 90.

Next, the user sets the porous impression die 101 on the pedestal 51 of the attachment 50, and places the attachment 50 on the tray 15 discharged from the apparatus 10. When a manipulation of mounting the attachment 50 is performed, the tray 15 is loaded into the seal carving apparatus 10 to retain the attachment 50. Then, after a predetermined initialization process is performed by the seal carving apparatus 10, seal carving of the porous impression die 101 is automatically carried out.

When the seal carving is completed, the tray 15 is automatically discharged. The user can take out the attachment 50 from the tray 15, and obtain the porous impression die 101 with the seal face formed thereon. As illustrated in FIG. 12, attaching the ink impregnated member 110 and the holder 112 to the porous impression die 101 with the seal formed thereon provides the porous stamp assembly 100 that has a unique seal pattern as ordered.

2. Processing by Seal Carving Apparatus

Figure 16:
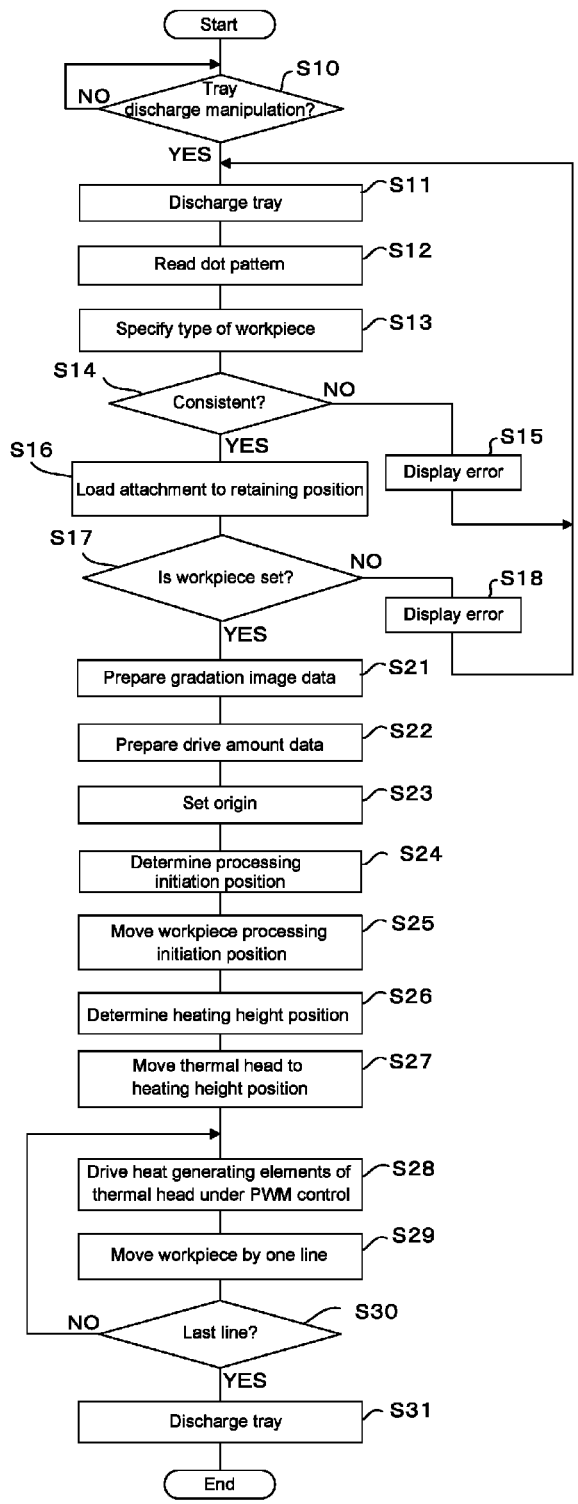
FIG. 16 is a flowchart illustrating seal carving in the seal carving apparatus.
Figure 17A:
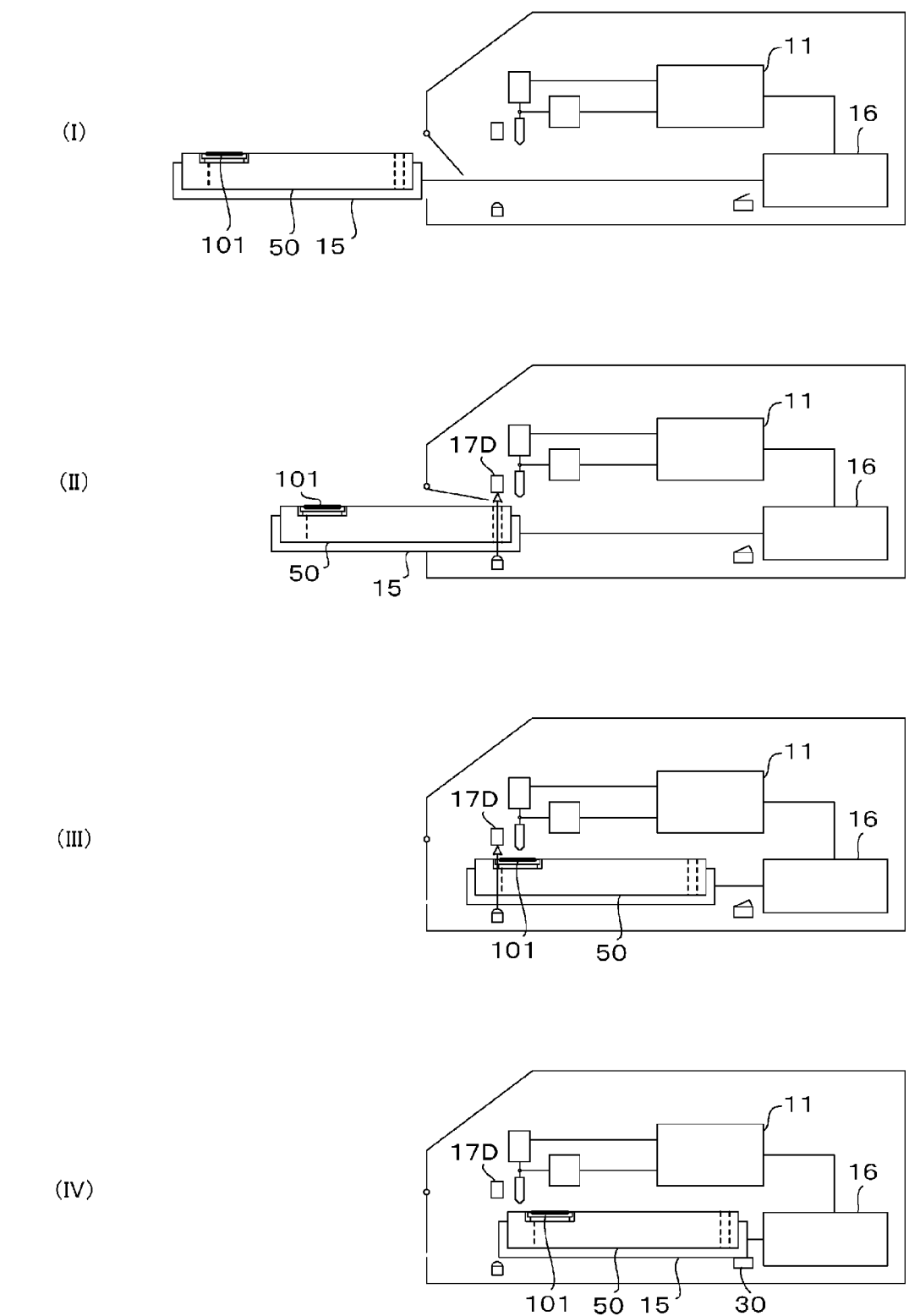
FIG. 17A is a diagram for describing a seal carving operation in the seal carving apparatus.
Figure 17B:
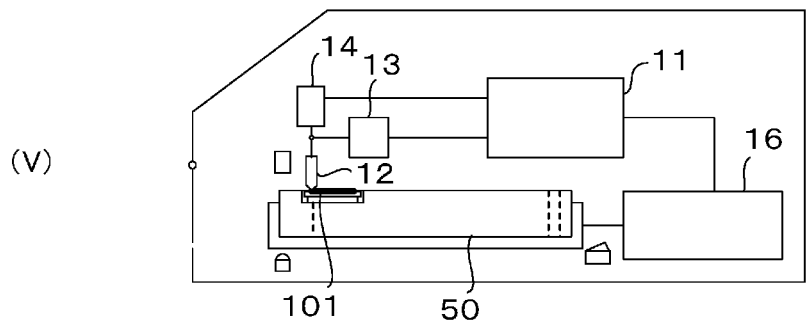
FIG. 17B is a diagram for further describing the seal carving operation in the seal carving apparatus.
Figure 17B:
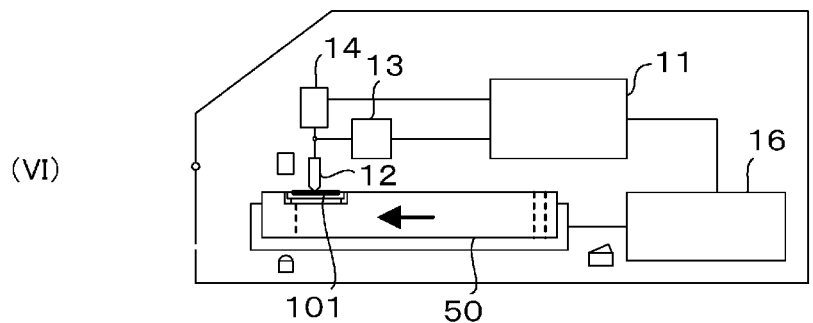
Figure 17B:
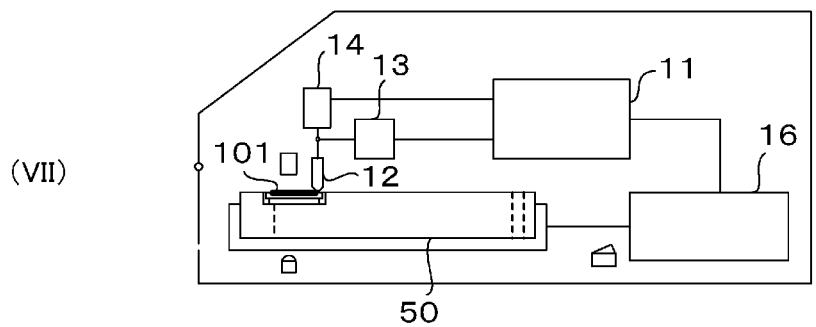

Next, the seal carving operation of the seal carving apparatus 10 is direction referring to FIGS. 16, 17A and 17B. The seal carving operation of the seal carving apparatus 10, which is mainly illustrated in a flowchart of FIG. 16, is achieved as a CPU included in the control device 11 executes an arithmetic operation according to a program stored in memory means such as the ROM 19*b*.

First, when a manipulation of discharging the tray 15 is accepted (step S10: YES), loading control means included in the control device 11 controls the loading mechanism 16 to load the tray 15 to the discharge position in next step S11. Then, the user mounts the attachment 50 on the tray 15 (FIG. 17A(I)). The loading control means loads the tray 15 to the first load-in position according to the manipulation of loading the tray 15 inside (FIG. 17A(II)), and the photosensors 17S, 17D read the dot pattern of the perforations 53, 53, . . . formed in the attachment 50 (step S12). The dot pattern of the perforations 53, 53, . . . may be read at the position where the attachment 50 is mounted on the tray 15 or a position at which the attachment 50 is retained further inside (e.g., an origin position to be described later or in the vicinity thereof).

In subsequent step S13, the control device 11 identifies the type of the mounted attachment 50 and the type (kind and carving size) of the workpiece set on the attachment 50 based on the read dot pattern. The identified type information of the workpiece may be displayed on the display part 18 of the seal carving apparatus 10. In step S14, consistency between the type information on the workpiece input to the terminal device 90 and the type of the attachment 50 and/or the type information on the workpiece, both identified from the dot pattern of the attachment 50, is determined. When those information are not consistent with each other (step S14: NO), an error may be displayed on the display part 18 in step S15, and retaining of the attachment 50 may be refused. In this way, the reading means (photosensors 17S, 17D) can read the dot pattern to identify the type of a workpiece at the time the attachment 50 is mounted, which is prior to the initiation of the carving. This makes it possible to prevent an improper processing manipulation or the like.

When it is determined that the type information are consistent with each other (step S14: YES), in step S16, the loading control means of the control device 11 controls the control device 11 to load the tray 15 and the attachment 50 to a second load-in position which lies further inside the seal carving apparatus 10. The process of identifying the type of the workpiece based on the dot pattern in step S13, and the process of determining the consistency of the type information in step S14 may be performed at the origin position to be described later or a nearby position at which the attachment is retained. In this case, when there is not the consistency of the type information, the tray 15 may be returned to the discharge position. This can prompt the user to redo the manipulation.

In step S17, the tray 15 and the attachment 50 are mounted in the seal carving apparatus 10, and the photodetectors 17D as the reading means examine the setting state of the porous impression die 101 or the workpiece on the attachment 50 (FIG. 17A(III)). When the porous impression die 101 is not set on the attachment 50 or is not properly set thereon (step S17: NO), an error is displayed on the display part 18 in step S18, and the tray 15 is returned to the discharge position. This can prompt the user to set the workpiece on the attachment 50.

When it is determined that the porous impression die 101 is properly set on the attachment 50 (step S17: YES), in next step S21, the gradation data preparing means included in the terminal device 90 prepares gradation image data from monochromatic image data. For example, the gradation data preparing means prepares gradation image data corrected in such a way that the pixel value monotonously changes stepwise in the boundary region where the value of the monochromatic image data for white/black is reversed. In step S22, the driving amount conversion means of the control device 11 converts the gradation image data to prepare driving amount data for the individual heat generating elements 12*a*.

In step S21, the gradation data preparing means may prepare gradation image data from monochromatic image data in view of a non-linear correlation between the driving amount of the heat generating elements which has been measured beforehand, and the ink permeability. In step S22, the driving amount conversion means may prepare driving amount data from gradation image data in view of the non-linear correlation.

In next step S23, the tray 15 and the attachment 50 are loaded to the deepest position (third load-in position; origin position), at which an origin sensor 30 is turned ON, thereby setting the origin of the loading (FIG. 17A(IV)). As the origin sensor 30, a photosensor that senses blocking of light when the tray 15 or the attachment 50 contacts the photosensor can be used. The origin may be set at the position where the tray 15 and the attachment 40 are discharged outside as illustrated in FIG. 17(I) (discharge position). In next step S24, the control device 11 determines a carving start position based on the type of the workpiece and the information on the carving size which are identified from the dot pattern of the perforations 53. In step S25, the loading control means controls the loading mechanism 16 to move the porous impression die 101 to the determined carving start position.

After the porous impression die 101 of the workpiece is moved to the carving start position, the control device 11 determines the heating height position of the thermal head 12 based on the kind of the workpiece identified from the dot pattern of the perforations 53 in step S26. The "heating height position" corresponds to the height position at which the thermal head 12 abuts on the porous impression die 101. In step S27, the control device 11 controls the elevation mechanism 14 to move the thermal head 12 downward to the determined heating height position. At this stage, the thermal head 12 abuts on the porous impression die 101 located at the carving start position (FIG. 17B(V)).

In step S28, the thermal drive control means of the control device 11 performs PWM controls on the thermal drive means 13 according to one line of driving amount data to selectively and thermally drive the heat generating elements 12a on the thermal head 12. Accordingly, the porous impression die 101 is thermally carved by one line. In next step S29, the loading control means of the control device 11 controls the loading mechanism 16 to move the porous impression die 101 by a one-line width in the load-out direction. The control device 11 performs seal carving line by line by repeating the processes of steps S28 and S29 (FIG. 17B(VI)). When completion of the processing of the last end line is decided in step S30 (FIG. 17B(VII)), the tray 15 is loaded to the discharge position in step S31. Accordingly, the user can acquire the porous impression die 101 with the seal pattern formed thereon.

Figure 18:
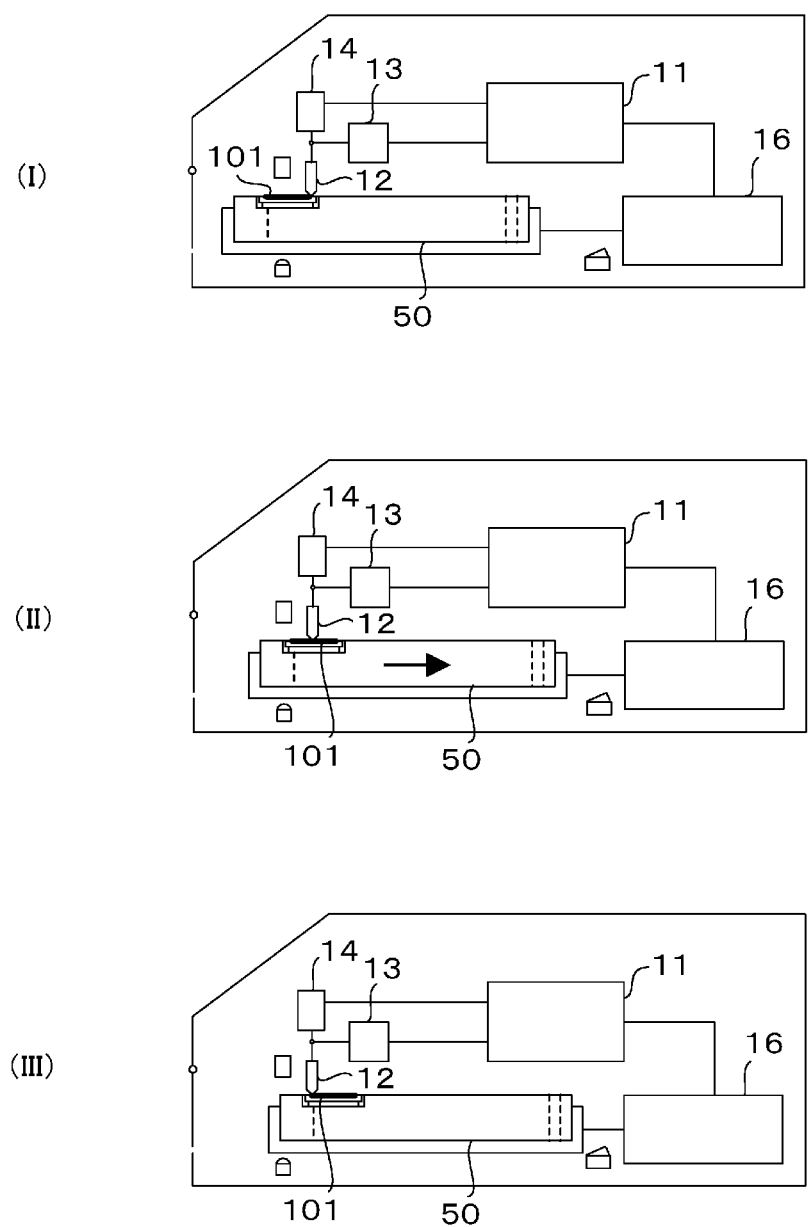
FIG. 18 is a diagram for describing a seal carving operation according to another embodiment.

As illustrated in FIG. 18, the seal carving may be carried out while moving the porous impression die 101 in the load-in direction. That is, the control device 11 determines the carving start position (at the right end in FIG. 18) after setting the origin, and controls the loading mechanism 16 to move the porous impression die 101 to the determined carving start position (FIG. 18(I)). Then, the control device 11 performs PWM control to thermally drive the heat generating elements 12a on the thermal head 12 while controlling the loading mechanism 16 to move the porous impression die 101 line by line in the load-in direction (FIG. 18(II)). Upon completion of the processing of the last end line (the left end in FIG. 18) of the porous impression die 101, the seal carving is completed (FIG. 18(III)).

The seal carving apparatus 10 for a porous material and the seal carving method for the apparatus according to the embodiment can accurately form a seal having a gradation as specified by image data. In particular, it is possible to accurately form a seal as specified by given monochromatic image data, which has the contour of a print portion subjected to gradation correction. Further, with the same carving accuracy, the carving time can be shortened compared with the conventional apparatus and method. In addition, the PWM control provides a uniform driving amount for the individual heat generating elements during a period of one-line carving, so that residual heat in the thermal head can be reduced, thereby reducing the influence of heat that is transmitted to a nearby porous material.

Although the preferred embodiments of the seal carving apparatus and the seal carving method according to the invention have been described, the technical concept of the invention shall not be construed to be limited to the embodiments described herein. Persons skilled in the art may change or improve those embodiments as needed without departing from the subject matter or technical concept of the invention. The peripheral techniques relating to seal carving apparatuses involving such changes or improvements should be understood to be encompassed within the technical scope of the invention.

REFERENCE SIGNS LIST

10 Seal carving apparatus
11 Control device
12 Thermal head
12a Heat generating elements
13 Thermal drive means
14 Elevation mechanism
15 Tray
16 Loading mechanism
17S, 17D Reading means (photosensors)
21 Oscillator
22 Line period signal generator
23 Loading control means
24 Thermal drive control means
25 Frequency divider
27 Base signal counter
28 DA converter
29 Comparator
30 Origin sensor
50 Attachment
51 Mount
90 Terminal device
100 Porous stamp assembly
101 Porous impression die
102 Porous film
103 Frame
112 Holder
110 Ink impregnated member

What is claimed is:

1. A seal carving apparatus including a thermal head having a plurality of individual heat generating elements disposed in lines, loading means that moves the thermal head and a porous material in relative to each other with the thermal head being in abutment with the porous material, and thermal drive control means that performs a control process of selectively and thermally driving the individual heat generating elements line by line while making the relative movement to carry out melt-solidification of the porous material, thereby forming a seal,
   wherein the thermal drive control means performs pulse width modulation control on a pulse time width for thermally driving the individual heat generating elements based on gradation image data having a gradation value to form the seal on the porous material, and
   wherein the thermal drive control means performs pulse width modulation control on driving amounts of the individual heat generating elements with a duty ratio of the pulse time width for a period of a modulation base signal which differs from a period of a carving period signal for forming one line of the seal.

2. The seal carving apparatus according to claim 1, wherein
   the period of the modulation base signal is set shorter than the period of the modulation base signal for forming one line of the seal.

3. The seal carving apparatus according to claim 1, wherein the thermal drive control means controls the pulse time width by setting an amplitude of a drive current that is supplied to the individual heat generating elements constant.

4. The seal carving apparatus according to claim 1, further comprising:

gradation data preparing means that prepares the gradation image data having the gradation value based on monochromatic image data representing a given seal pattern; and driving amount conversion means that converts the prepared gradation image data to driving amount data of the individual heat generating elements, wherein the thermal drive control means performs pulse width modulation control on driving amounts of the individual heat generating elements with a duty ratio corresponding to the driving amount data.

5. The seal carving apparatus according to claim 4, wherein the gradation data preparing means prepares gradation image data corrected in such a way that a pixel value monotonously changes stepwise in a boundary region where a value of the monochromatic image data is inverted.

6. A porous stamp produced using a seal carving apparatus including a thermal head having a plurality of individual heat generating elements disposed in lines, and control means that performs a control process of selectively and thermally driving the individual heat generating elements while moving the thermal head and a porous material in relative to each other with the thermal head being in abutment with the porous material, thereby forming a seal on the porous material, wherein based on monochromatic image data representing a given seal pattern, the control means prepares gradation image data corrected in such a way that a pixel value monotonously changes stepwise in a boundary region where a value of the monochromatic image data is inverted, and the control means thermally drives the individual heat generating elements by a driving amount based on the gradation image data, thereby forming a seal with a gradation on the porous stamp.

* * * * *